United States Patent [19]

McArdle

[11] Patent Number: 5,591,473

[45] Date of Patent: Jan. 7, 1997

[54] PROTEIN-POLYSACCHARIDE COMPLEX COMPOSITION, METHOD OF PREPARATION AND USE

[76] Inventor: Blaise McArdle, R.R. 2, Mount Vernon, Me. 04352

[21] Appl. No.: 523,162

[22] Filed: Sep. 5, 1995

Related U.S. Application Data

[63] Continuation-in-part of Ser. No. 263,001, Jun. 17, 1994, abandoned, which is a continuation-in-part of Ser. No. 89,268, Jul. 8, 1993, abandoned.

[51] Int. Cl.$^6$ .................................. A23J 1/12; A23J 3/14; A23L 1/053; A23L 1/0532
[52] U.S. Cl. ......................... 426/573; 426/656; 426/89; 426/103; 426/419; 426/531; 426/424; 426/289; 426/295
[58] Field of Search .................................... 426/573, 656, 426/89, 103, 419, 531, 424, 289, 295

[56] References Cited

U.S. PATENT DOCUMENTS

| | | |
|---|---|---|
| 4,376,133 | 3/1983 | Farnand . |
| 4,754,027 | 6/1988 | Applegren . |
| 4,996,063 | 2/1991 | Inglett . |
| 4,997,671 | 3/1991 | Spanier . |
| 5,021,248 | 6/1991 | Stark et al. . |
| 5,182,130 | 1/1993 | Haralampu et al. . |
| 5,294,457 | 3/1994 | Jenkins et al. . |

*Primary Examiner*—Jeanette Hunter
*Assistant Examiner*—Choon P. Koh

[57] ABSTRACT

A protein-polysaccharide complex composition is prepared by admixing a water-soluble polysaccharide with a substantially water-insoluble protein in an alcohol/water solution. In the recovered complex the water-insoluble protein impregnates or coats the water-soluble polysaccharide without affecting the beneficial properties of the polysaccharide and protein.

17 Claims, No Drawings

PROTEIN-POLYSACCHARIDE COMPLEX COMPOSITION, METHOD OF PREPARATION AND USE

CROSS-REFERENCE TO RELATED APPLICATIONS

This application is a continuation-in-part of application Ser. No. 08/263,001 filed on Jun. 17, 1994, now abandoned, which is a continuation-in-part of application Ser. No. 08/089,268, filed on Jul. 8, 1993, now abandoned.

FIELD OF THE INVENTION

This invention relates generally to protein complex compositions, methods of preparation of protein-polysaccharide complex compositions and uses of protein complex composition and, specifically, to a protein-polysaccharide complex composition including a water-soluble polysaccharide, a substantially water-insoluble protein and an acidulant.

BACKGROUND OF THE INVENTION

Proteins or prolamines, such as zein, have many utilities due to their amphoteric nature. Proteins have been used in a wide variety of applications including in the production of paper coatings, grease-resistant coatings, laminated boards, solid color prints, printing inks, food coatings, and microencapsulants. Prolamines are substantially insoluble in water and in alcohol but are soluble in alcohol-water mixtures.

It is desirable to obtain a protein complex for applications in aqueous environments to utilize the amphoteric characteristics of the protein component.

It is an object of the present invention to produce a water soluble complex containing both a substantially water insoluble protein and a polysaccharide displaying beneficial characteristics of both proteins and polysaccharides.

It is an object of the present invention to provide a process for the production of a protein complex formed by impregnating or coating a polysaccharide with a substantially water-insoluble protein.

Still other objects and advantages of the invention will in part be obvious and will in part be apparent from the specification.

SUMMARY OF THE INVENTION

Generally speaking, in accordance with the invention a protein-polysaccharide complex composition including at least one water-soluble polysaccharide, at least one substantially water-insoluble protein and an acidulant is provided. Methods of preparation of the composition and numerous methods of use are also provided.

The invention is directed to the protein-polysaccharide complex composition of matter possessing the characteristics, properties and the relationship of constituents; and the several steps in preparation of the composition exemplified in the methods hereinafter disclosed.

DETAILED DESCRIPTION OF THE PREFERRED EMBODIMENTS

The protein-polysaccharide complex compositions of the present invention include at least one water-soluble polysaccharide, at least one substantially water-insoluble protein and an acidulant. The protein-polysaccharide complex composition can be used as a food preservative, a carrier for pharmaceuticals, an absorbent for waste water treatment, a surfactant to emulsify oil preparations or to control foaming characteristics of anionic and cationic surfactant blends, an absorbent for removing oil from water, soil or sand, an odor suppressant, a carrier for inorganic compounds including metal oxides, a soil stabilizing agent, a herbicide, a dye carrier, a clarifying agent, a plasticizer for polymers, a stabilizer and adhesion promoter for cement and asphalt and an adhesion promoter for binding particulates including silica in polymers including natural and synthetic rubbers.

The protein-polysaccharide complex (PPC) composition of the present invention includes a water-soluble polysaccharide, a substantially water-insoluble protein, and an acidulant. The polysaccharides are water-soluble, and if used to produce a product for human or animal consumption, are generally recognized as safe (G.R.A.S.) by the U.S. Food and Drug Administration. In general, the water-soluble polysaccharides are plant-derived polysaccharides and related materials such as pectin.

Examples of polysaccharides that can be used to prepare the PPC composition include, but are not limited to water-soluble cellulose derivatives, seaweed polysaccharides such as alginate and carrageenin, seed mucilaginous polysaccharides, complex plant exudate polysaccharides such as gum arabic, tragacanth, guar gum, pectin, ghatti and the like, and microbially synthesized polysaccharides such as xanthan gum. In a preferred embodiment, the polysaccharides are guar gum, pectin, gum arabic and mixtures thereof.

The polysaccharide preferably is present in an amount ranging between about 90% to 99.5% by weight of the total PPC composition, preferably in an amount ranging between about 95% to 99% by weight of the total PPC composition. The total PPC composition is defined as the total weight of the protein and polysaccharide components.

Similarly, the protein can be any protein that is predominately or substantially water-insoluble, however, vegetable proteins are advantageously utilized due to their availability. In general, the vegetable protein is a prolamine. A prolamine is a cereal-derived protein that is insoluble in water, absolute alcohol or neutral solvents and soluble in dilute (80%) alcohol. Suitable examples of prolamines include, but are not limited to, corn-derived prolamine or zein, barley-derived prolamine or hordein and wheat-derived prolamine or giladin.

The substantially water-insoluble protein is present in an amount ranging between about 0.5% to 10% by weight of the total PPC composition, preferably in an amount ranging between about 1% to 5% by weight of the total PPC.

In a preferred embodiment of the invention, the vegetable protein or prolamine used in the composition is zein or corn gluten. Zein is extracted from corn or maize. PPC compositions containing zein are used to form odorless, tasteless, clear, hard and almost invisible films.

Sixteen amino acids have been isolated from zein including glutamic acid or glutamine, leucine, proline, alanine, phenylalanine, isoleucine, serine, tyrosine and asparagine. The remaining seven amino acids are present in amounts of less than 3% by weight. Of the eight amino acids that are necessary for protein synthesis in the human body, zein has virtually no lysine or tryptophan.

Zein is extracted from corn gluten by physical separation means as opposed to chemical separation means. Whole corn zein contains a heterogeneous mixture of disulfide linked aggregates. Commercial extraction results in a product with a molecular weight of 25,000 to 35,000. Zein contains a high proportion of hydrocarbon group side chains and has a high percentage of amide groups present with a relatively low amount of free carboxylic acid groups.

Relatively small amounts of organic acids or acidulants are used to lower the pH of the aqueous polysaccharide solutions during preparation of the PPC compositions. The acidulants enhance the water dispersibility of the PPC compositions, i.e. to facilitate reconstitution of the protein-polysaccharide complex compositions in water.

Relatively small amounts of a pH adjusting compound in the form of an acid or an acidulant are preferably used to lower the pH of the aqueous polysaccharide solutions during preparation of the PPC compositions to between 1 to 11.5, preferably about 3.8 to 8.5. The acidulants enhance the water dispersibility of the PPC compositions, thereby facilitating reconstitution of the protein-polysaccharide complex compositions in water. Although any pH adjusting acidic compound is useful in the present invention, including inorganic acids such as carbonic acid, sulfuric acid, hydrochloride acid and the like, it is preferable to utilize organic acids, preferably $C_1$ to $C_{20}$ organic acids. Suitable organic acidulants include, but are not limited to, citric acid, malic acid, adipic acid, tannic acid, lactic acid, ascorbic acid, acetic acid, fumaric acid and the like and mixtures thereof. In a preferred embodiment, citric acid is used.

The acidulants are used in an amount between about 0.25% to 5% by weight of the total PPC compositions, preferably in an amount between about 0.5% to 1% by weight. The acidulant is preferably added to the water of an aqueous organic solvent system prior to addition of the organic component.

A PPC composition is prepared by dissolving the substantially water-insoluble protein or prolamine in an aqueous organic solvent system containing the acidulant to form a protein solution. The soluble polysaccharide is then added to the protein solution to form a protein-polysaccharide complex in solution. The solvent is separated or evaporated from the solution to yield the final protein-polysaccharide complex (PPC) composition.

The aqueous organic solvent system is a mixture containing at least one organic solvent in water. Suitable organic solvents include, but are not limited to, alcohols such as ethyl alcohol and isopropyl alcohol; edible glycols such as propylene glycol and certain polyethylene glycols; and, ketones such as acetone. In a preferred embodiment of the invention, the aqueous organic solvent system is either aqueous ethyl alcohol or aqueous isopropyl alcohol. Alcohols generally can hold up to six grams of zein in solution for each 100 milliliters of alcohol.

The desired ratio of water to organic solvent in the aqueous organic solvent system is dependent on factors such as the miscibility of the solvent in the water and the amount of protein to be dissolved. When the organic solvent system is aqueous ethyl alcohol or aqueous isopropyl alcohol, the amount of water generally ranges between about 10% to 40% by weight and the amount of alcohol generally ranges between about 60% to 90% by weight. More preferably, the amount of water in such systems is between about 25% to 35% and the amount of alcohol is between about 65% to 75%.

The substantially water-insoluble protein or prolamine is added to the aqueous organic solvent system in an amount between about 100 and 300 grams of prolamine per liter of aqueous organic solvent system, more preferably in an amount between about 120 to 240 grams per liter. The dissolution is carried out at a temperature between about 20° C. (ambient room temperature) and about 60° C., preferably about 30° C. using conventional agitation methods to form a protein solution. Soluble polysaccharide in minute fiber or particulate form is then admixed with the protein solution to form a PPC in solution.

In an alternative embodiment, a protein containing gluten such as corn gluten can be directly added into the aqueous organic solvent system instead of pure zein thus passing the zein protein portion of the gluten into solution while the deprotenated non-zein remainder of the gluten can be separated by vacuum filtering or other standard separation techniques. An incidental amount of up to 100%, preferably up to 10% by weight of deprotenated gluten can be present in the recovered in admixture with the protein-polysaccharide complex without adversely affecting the properties of the complex.

The PPC in solution generally contains between about 90% to 99.5% of polysaccharide and between about 0.5% to 10% of a protein based on the combined total weight of the polysaccharide and the protein. More preferably, the PPC in solution contains between about 95% to 99% of polysaccharide and between about 1% to 5% of vegetable protein based on the total weight of polysaccharide and protein.

It is important that the substantially water-insoluble protein or prolamine thoroughly impregnate the soluble polysaccharide particles during the process of admixing the soluble polysaccharide with the protein solution. The aqueous organic solvent system used to prepare the protein solution should wet the soluble-polysaccharide particles so that the hydrophilic soluble polysaccharide particles are impregnated or coated with the hydrophobic protein to form the PPC solution.

The admixing process is carried out until a complete uniform mixture is attained. In general, the process is carried out at a temperature between about 20° C. and 60° C., preferably between about 20° C. and 25° C. for a time period of between about 10 and about 30 minutes, preferably between about 10 and 15 minutes. The PPC solution is agitated during the admixing process by conventional agitation methods including, but not limited to, manual shaking, mechanical shaking, magnetic stirring, mechanical stirring or a combination thereof.

Additives that promote impregnation may be added at any point during the admixing process. Suitable additives include, but are not limited to, detergents and emulsifiers. Exemplary additives are polysorbates, edible vegetable oils and egg albumin.

Dispersibility and film forming characteristics of the PPC composition can be modified by adding up to 5%, preferably 0.125% to 5%, by weight of particulate metal oxides or sulfides containing metals from Periodic Table Groups 4 to 13, preferably Groups 8 to 10, most preferably any valent form of iron oxide and iron sulfide. These metal oxides or sulfides can be added to the initial solvent system to admix with the PPC composition during formation or be subsequently added to and mixed with the dry powdered PPC composition. The solution or powder applied to the ground surfaces may additionally contain one or more additives at a total level of up to 20% by weight of the combined polysaccharide and protein components of the PPC composition including fillers, pigments, stabilizers, thickening agents, buffers, fertilizers, mineral salts and plant protection agents. Particularly useful fillers include waxes, paraffins, resin, lignin stabilizers, $SiO_2$, drilling muds and borax (sodium borate). Borax is preferably added only to a dry mixture of a PPC composition.

Once the PPC solution has been prepared, the solvent is separated or evaporated to yield a protein-polysaccharide complex composition, that is, particulate polysaccharide impregnated or complexed with a protein. Any number of solvent removal techniques may be used including, but not limited to, vacuum drying, centrifugation, evaporation, freeze drying, air drying, convection oven drying or a combination thereof.

It is preferred that the solvent removal technique be one that does not require the use of excessive or prolonged heat that will oxidatively darken the product. Although oxidative darkening has little effect on the utility of the product it may affect its appeal and desirability. One preferred method of extracting the solvent is vacuum drying which safety removes and recovers the solvent while drying the product to provide the PPC composition.

The protein-polysaccharide complex composition provided in accordance with the invention can be further processed by grinding or milling to a desired mesh particle size for use in tablets, granules, powders, pellets, extrusions, flours and the like. In a preferred embodiment, the composition can be formed into a powder.

The following examples of preparation of the dietary fiber composition are presented for purposes of illustration only and are not to be construed to limit the scope of the invention described herein.

EXAMPLE 1

A 10% zein solution was prepared by dissolving 10 grams of zein (Freeman Industries, Inc.) in 90 grams of an aqueous isopropyl alcohol solution. The aqueous isopropyl alcohol solution contained 15% water by weight and 85% isopropyl alcohol by weight. Dissolution was carried out in a 500 ml beaker and the solution was initially stirred using a mechanical stirrer at a speed of over 100 rpm in order to fully wet the zein. Once all of the zein was dispersed, the stirring speed was reduced by about ½ for an additional five minutes to insure complete dissolution of the zein in the aqueous isopropyl alcohol solution. The ambient temperature was maintained at 22° C. throughout this procedure. Accordingly, a protein solution was provided.

Two hundred grams (200 g) of milled guar gum powder (fine-60 mesh, TIC GUMS, Belcamp, Md.) was slowly added to the protein solution with vigorous stirring using a mechanical stirrer at a speed of over 100 rpm. Manual stirring was started as the mixture thickened. Additional aqueous isopropyl alcohol was added as needed to attain a soupy appearance indicative of successful impregnation of the soluble guar gum particles by the zein solution. Agitation of this soupy liquid mixture was maintained for fifteen minutes.

The resulting PPC solution was dried under reduced pressure of 0.05 atmospheres at a temperature of 60° C. using a lab-line Duo-Vac vacuum oven manufactured by LabLine Corp., Melrose Park, Ill. The resulting dried PPC composition was a yellowish-beige color and was milled to a granular form (80 mesh).

EXAMPLE 2

A soupy PPC solution containing was prepared as described in Example 1. After addition of the guar gum was complete, 20 grams of dried egg albumin (Henigson, Inc., White Plains, N.Y.) was added and dispersed completely. The solution was dried under reduced pressure at 60° C. using a Lab-Line Duo-Vac vacuum oven. The resulting PPC composition was a yellowish-beige color and was milled to a granular form.

EXAMPLE 3

Fifty grams (50 g) of citric acid was added to 0.675 kg of water used to prepare 4.5 kg of an 85:15 alcohol: water aqueous organic solvent system. Five hundred grams of zein was added to the aqueous organic solvent system in a suitable vessel. The aqueous organic solvent was kept in motion during the addition with the aid of a mechanical stirrer. Accordingly, a solution of 10% by weight of zein in aqueous alcohol was prepared.

Nine and one-half kg of guar gum was added to the 10% zein solution with mixing in a Stokes Heavy Duty sigma-type blender. After about 30 minutes of continuous mixing, the mass was homogeneous, slightly tan and had a wet, sand-like consistency. The mass was dried in an explosion-proof drier to yield a protein-polysaccharide complex.

EXAMPLE 4

The procedure of Example 1 was followed, however 1.5 grams of iron oxide (FeO) (Harcros high moment iron oxide TB5600 -lot F4122, Easton, Pa.) was mixed per each 10 grams of zein contemporaneously with the addition of the guar gum. The iron oxide/PPC mixture was not recovered from the solution but 4405.3 ml containing approximately 2516.5 grams of PPC was directly mixed into a 250 gallon gravity spray applicator filled with water.

EXAMPLE 5

Dry granular PPC as prepared in accordance with the procedure of Example 1 additionally containing 10% by weight of expended corn gluten was mixed with 0.5% by weight of iron oxide for dispersal in a hand held fertilizer applicator. The dry granular PPC was also premixed with 2% by weight of borax.

The PPC compositions provided in accordance with Examples 1–5 are useful in a variety of utilities including as a food preservative, a carrier for pharmaceuticals, an absorbent for waste water treatment, a surfactant to emulsify oil preparations or to control foaming characteristics of anionic and cationic surfactant blends, a carrier for inorganic compounds including metal oxides, an absorbent for removing oil from water, sand or soil, an odor suppressant, a soil stabilizing agent, a dye carrier, a herbicide, a clarifying agent or a plasticizer for polymers, a stabilizer and adhesion promoter for cement and asphalt compositions and an adhesive promoter for binding particulates including silica in polymers including natural and synthetic rubbers.

The dried PPC composition is preferably added to the water in an amount ranging between about 2 to 50 grams per gallon of water, preferably in an amount between about 2 to 10 grams per gallon. The PPC composition is thoroughly dispersed in the water by mixing, for example, with a mechanical stirrer to form a homogeneous dispersion.

It will thus be seen that the objects set forth above, among those made apparent from the preceding description, are efficiently attained and, since certain changes may be made in the described product, and in carrying out the above process, and in the construction set forth without departing from the spirit and scope of the invention, it is intended that all matter contained in the above description shall be interpreted as illustrative and not in a limited sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

What is claimed is:

1. A protein-polysaccharide complex composition comprising:

between about 90% to 99.5% by weight of a water-soluble polysaccharide impregnated with between about 10% to 0.5% by weight of a substantially water-insoluble protein.

2. The protein-polysaccharide complex composition of claim 1 wherein the water-soluble polysaccharide is selected from the group consisting of alginate, carrageenin, gum arabic, tragacanth, guar gum, pectin, ghatti, xanthan gum and mixtures thereof.

3. The protein-polysaccharide complex composition of claim 1 wherein the substantially water-insoluble protein is a prolamine.

4. The protein-polysaccharide complex composition of claim 1 wherein the substantially water-insoluble protein is zein.

5. The protein-polysaccharide complex composition of claim 1 wherein the composition further includes at least one additive for promoting impregnation of the water-soluble polysaccharide by the protein.

6. The protein-polysaccharide complex composition of claim 1 wherein the substantially water-insoluble protein is hordein or gliadin.

7. The protein-polysaccharide complex composition of claim 1 wherein the water-soluble polysaccharide is in a particulate form.

8. The protein-polysaccharide complex composition of claim 1 wherein the water-soluble polysaccharide comprises guar gum and the substantially water-insoluble protein comprises zein.

9. The protein-polysaccharide complex composition of claim 1 further comprising:

between about 0.25% to 5% by weight of an acidulant.

10. The method of claim 9 wherein the acidulant is selected from the group consisting of tannic acid, lactic acid, ascorbic acid, acetic acid, citric acid, malic acid, adipic acid, fumaric acid and mixtures thereof.

11. The protein-polysaccharide complex composition of claim 9 wherein the acidulant is citric acid.

12. The method of claim 1 wherein the protein-polysaccharide composition further comprises 0.125 to 5% by weight of a metal oxide filler calculated on the weight of protein-polysaccharide complex.

13. The method of claim 12 wherein the metal oxide filler is iron oxide.

14. A protein-polysaccharide complex composition comprising a polysaccharide particulate impregnated with a vegetable protein selected from the group consisting of zein, hordein and gliadin and mixtures thereof, wherein the protein complex comprises 90% to 99.5% by weight of a polysaccharide and 0.5% to 10% by weight of the protein.

15. The protein-polysaccharide complex composition of claim 14 wherein the protein is zein.

16. The protein-polysaccharide complex composition of claim 14 wherein the polysaccharide is selected from the group consisting of alginate, carrageenin, gum arabic, tragacanth, guar gum, pectin, ghatti, xanthan gum and mixtures thereof.

17. The protein-polysaccharide complex composition of claim 14 wherein the composition is additionally admixed with up to 10% by weight of a deprotenated gluten.

* * * * *

UNITED STATES PATENT AND TRADEMARK OFFICE
CERTIFICATE OF CORRECTION

PATENT NO. : 5,591,473
DATED : January 7, 1997
INVENTOR(S) : Blaise McArdle

It is certified that error appears in the above-identified patent and that said Letters Patent is hereby corrected as shown below:

On the title page, Item [76] should read as follows:

Inventors: Blaise McArdle, R.R. 2 Mount Vernon, ME 04352; Paul G. Freedman, 2 Turner Drive, New Rochelle, NY 10804.

Signed and Sealed this

Twenty-ninth Day of December, 1998

*Attest:*

BRUCE LEHMAN

*Attesting Officer*     *Commissioner of Patents and Trademarks*